3,049,481
NON-CORROSIVE REACTOR FUEL SYSTEM

Claude C. Herrick, Los Alamos, N. Mex., assignor to the United States of America as represented by the United States Atomic Energy Commission
No Drawing. Filed Apr. 25, 1960, Ser. No. 24,625
2 Claims. (Cl. 204—154.2)

This invention pertains to nuclear reactor fuel systems and more particularly to non-corrosive fuel systems utilizing molten plutonium in a tantalum fuel container.

Plutonium is recognized as a desirable fissionable element for use in a homogeneous nuclear power reactor. However, there are two main disadvantages to the use of pure plutonium as a liquid reactor fuel. These disadvantages are the relatively high melting point of plutonium (about 640° C.) and the fact that plutonium attacks and aggressively corrodes commonly used fuel container materials. The first mentioned disadvantage has been overcome by alloying plutonium with a neutronically compatible element, such as iron, cobalt or nickel. For example, as shown by William Chynoweth in his U.S. Patent No. 2,890,954, entitled "Plutonium Alloys," issued June 16, 1959, the plutonium-iron binary system has a eutectic point at 9.5 atomic percent iron and 410° C.

The latter mentioned disadvanatge has been only partially alleviated by the selection of container materials and the application of certain coatings on the container surfaces. Tantalum and tungsten have been found to possess better corrosion resistance properties than other probable container materials, with tantalum being the most frequently used because it is easier to fabricate into the desired configuration. Even though tantalumn has been found to be about the best fuel container material, the plutonium corrosion effect still remains a serious problem. It has also been found that the corrosion of the tantalum can be deterred by coating the fuel-contacting surfaces of the container with tantalum carbide, TaC. However, minute discontinuities in the coating which allow exposure of tantalum to plutonium will provide a point of attack for plutonium corrosion. Also, after a period of time minute cracks may appear in the coating, thereby exposing the tantalum to the corrosive effect of plutonium in the fuel.

It is therefore an object of the present invention to provide a non-corrosive fuel system for a nuclear reactor.

It is a further object of the present invention to provide a non-corrosive fuel system for a nuclear reactor utilizing molten plutonium in a tantalum fuel container.

It is a still further object of the present invention to provide a non-corrosive fuel system for a nuclear reactor utilizing molten plutonium in a tantalum carbide coated tantalum fuel container.

It is yet another object of the present invention to provide low melting point plutonium alloy reactor fuels compatible with the fuel container.

The preferred embodiment of the present invention accomplishes the stated objects by utilizing, in conjunction with a tantalum fuel container, a reactor fuel alloy consisting of from 8 to 12 atomic percent iron, about 2 atomic percent carbon, and the remainder plutonium. The incorporation of sufficient carbon into the basic plutonium-iron fuel alloy results in the desired non-corrosive properties for, upon contact of the molten alloy with tantalum, carbon readily leaves the fuel alloy and combines with the tantalum to form a tantalum carbide, TaC, coating appromixately 10 mils thick on the tantalum. Thus, when the alloy is used with a tantalum carbide coated tantalum fuel container the coating will be self-healing since upon exposure of the underlying tantalum to the fuel alloy, tantalum carbide will quickly form, thereby maintaining the integrity of the tantalum carbide coating. Also, if desired, the alloy may be used in an uncoated tantalum container, as a coating will be readily formed (and maintained) upon heating the alloy within the container. About 2 atomic percent carbon in the alloy is sufficient for formation of the 10 mil thickness carbide coating with enough carbon left in the alloy to maintain the integrity of the coating by healing cracks or other discontinuities. This small amount of carbon incorporated into the basic plutonium-iron alloy causes no significant displacement of the liquidus lines in the Pu-Fe phase diagram, hence determination of permissible variation from the Pu-Fe eutectic composition for desired reactor operating temperatures can be easily determined. (Two atomic percent carbon is also about the maximum amount that can be incorporated into the alloy without affecting the Pu-Fe phase diagram.) Plutonium-iron alloys within the range of from 8 to 12 atomic percent iron are sufficiently close to the eutectic composition to have melting points less than about 480° C.

The most convenient method for preparing the alloys of the present invention is to utilize a graphite mold shaped in accordance with tantalum fuel container to be used. Plutonium and iron, in chunk or button form, are placed in the mold which is arranged in a conventional vacuum furnace capable of achieving a vacuum of at least $10^{-4}$ mm. of mercury at room temperature. (When the metals are melted, outgassing will degrade the vacuum to about $10^{-3}$ mm. to $5 \times 10^{-4}$ mm. of Hg.) The metals are melted and held in the molten state a sufficient time for the desired amount of carbon to be picked up from the graphite mold. The amount of carbon absorbed by the liquid alloy is a function primarily of temperature, time and the type of graphite employed. When casting a cylindrical shape, approximately ⅝" diameter and 8" long, about 2 atomic percent carbon will be absorbed by the liquid alloy in less than 10 to 12 hours at a temperature of 1000° C. An alternative method is to prepare the above alloy utilizing pure plutonium, iron and iron carbide in the correct proportions.

Other conventional casting methods may be used to prepare the alloys of the present invention, however the desired amount of carbon must be present within the alloy prior to its introduction into the tantalum fuel container. The desired coating cannot be obtained by placing a plutonium-iron alloy in the tantalum fuel container, adding amorphous carbon, and heating.

When an alloy of the present invention is utilized as the liquid fuel in a nuclear reactor, an auxiliary heating apparatus may be provided for premelting the alloy. Once in use in a critical reactor region, the alloy will be kept in liquid form by the heat of the nuclear reaction.

The plutonium used in the alloys of the present invention should be at least 98 to 99 percent pure and should not contain significant amounts of neutron-absorbing elements. Although a plutonium of lesser purity can be used if the impurities are not neutron-absorbing elements or elements with greater carbon affinity, the purities specified are easily achieved and generally expected in the reactor art. The alloying elements must be of a correspondingly high neutronic and chemical purity.

About 2 atomic percent carbon can be added to plutonium-nickel and plutonium-cobalt alloys having compositions close to their respective eutectic values to provide reactor fuels exhibiting the same non-corrosive effect when used in conjunction with a tantalum container. It is to be expected that alloys exhibiting similar non-corrosive characteristics with respect to tantalum can be formed by adding to plutonium any metal (or metals)

having less chemical affinity for carbon than tantalum. Theoretically, then, any metal except titanium, zirconium, hafnium, thorium and possibly niobium could be used. The selection of an alloying metal for reactor fuel purposes of course would depend upon various other factors such as neutronic compatibility with plutonium, radiation stability, etc. Thus, although the invention has been described with a certain degree of particularity, it is understood that the present disclosure has been made only by way of example and that numerous changes in the composition and methods of fabrication may be resorted to without departing from the spirit and the scope of the invention as hereinafter claimed.

What is claimed is:

1. In a homogeneous nuclear reactor the combination of a tantalum carbide coated tantalum container and a liquid nuclear reactor fuel system contained therein, said reactor fuel system consisting essentially of from 8 to 12 atomic percent iron, about 2 atomic percent carbon, and the balance plutonium, said carbon being present to self heal the tantalum carbide coating.

2. In a homogeneous nuclear reactor the combination of a tantalum container and a liquid nuclear reactor fuel system contained therein, said nuclear fuel system consisting essentially of from 8 to 12 atomic percent iron, about 2 atomic percent carbon, and the balance plutonium, said carbon being provided to combine with the interior surface of the tantalum container to form a plutonium resistant self-healing tantalum carbide film.

References Cited in the file of this patent

UNITED STATES PATENTS 2,864,731     Gurinsky et al.     Dec. 16, 1958
2,890,954     Chynoweth     June 16, 1959

OTHER REFERENCES

Atomics, May 1957, pages 168–172.

Proceedings of the 1957 Fast Reactor Information Meeting, held in Chicago, Illinois, November 20–21, 1957, pages 172–178.

Second United Nations International Conference on the Peaceful Uses of Atomic Energy, vol. 6, pages 162–169.

AEC Document BMI–1324, March 1, 1959, pages 59–62.

AEC Document BMI–1340, May 1959, pages 81–86.